United States Patent
Kaidi et al.

(10) Patent No.: US 12,508,059 B1
(45) Date of Patent: Dec. 30, 2025

(54) ORTHOPEDIC SCREW AND SCREW FASTENING DEVICE FOR ORTHOPEDIC OPERATIONS

(71) Applicant: KinetiQ Systems LLC, New York, NY (US)

(72) Inventors: Austin Camron Kaidi, New York, NY (US); Sheeraz Ahmed Qureshi, New York, NY (US)

(73) Assignee: KinetiQ Systems LLC, New York, NY (US)

( * ) Notice: Subject to any disclaimer, the term of this patent is extended or adjusted under 35 U.S.C. 154(b) by 0 days.

(21) Appl. No.: 19/054,232

(22) Filed: Feb. 14, 2025

Related U.S. Application Data

(60) Provisional application No. 63/751,637, filed on Jan. 30, 2025.

(51) Int. Cl.
*A61B 17/86* (2006.01)
*A61B 17/70* (2006.01)
*A61B 17/88* (2006.01)

(52) U.S. Cl.
CPC ............ *A61B 17/864* (2013.01); *A61B 17/70* (2013.01); *A61B 17/8615* (2013.01); *A61B 17/863* (2013.01); *A61B 17/8888* (2013.01)

(58) Field of Classification Search
CPC .......................... A61B 17/864; A61B 17/8888
See application file for complete search history.

(56) References Cited

U.S. PATENT DOCUMENTS

2020/0375750 A1* 12/2020 Abbasi ............... A61B 17/8605

\* cited by examiner

*Primary Examiner* — Olivia C Chang
(74) *Attorney, Agent, or Firm* — Fish & Richardson P.C.

(57) ABSTRACT

An orthopedic screw for implantation in one or more bones of a subject includes a cannulated body and a head. The cannulated body defines (i) one or more fenestrations and (ii) a hollow portion in fluid communication with the one or more fenestrations. The head (i) has an outer edge with a geometric shape configured to receive a driver, (ii) defines a inner edge with threaded shape configured to receive a screw capture device, and (iii) is configured to receive a material from an external source and direct the material into the hollow portion of the cannulated body.

17 Claims, 8 Drawing Sheets

ORTHOPEDIC SCREW AND SCREW FASTENING DEVICE FOR ORTHOPEDIC OPERATIONS

CROSS REFERENCE TO RELATED APPLICATIONS

This application claims the benefit of U.S. provisional Patent Application 63/751,637, filed Jan. 30, 2025, which is hereby incorporated by reference in its entirely.

TECHNICAL FIELD

This description generally relates to an orthopedic screw, a screw fastening device, and methods for performing medical operations using the orthopedic screw and the screw fastening device.

BACKGROUND

Screws and screw fastening devices (also referred to as drivers) may be used across a wide range of medical procedures to secure, stabilize, or fasten components within the body. These devices may be used in surgeries where precision and stability are needed, such as orthopedic and reconstructive operations. These tools may enable surgeons or medical professionals to fixate bones, secure implants, and/or stabilize structures during healing. The screws may be made of biocompatible materials and may be designed to integrate safely within the body parts.

SUMMARY

Implementations according to this disclosure includes an orthopedic screw for implantation in one or more bones of a subject. The orthopedic screw includes a cannulated body and a head. The cannulated body defines (i) one or more fenestrations and (ii) a hollow portion in fluid communication with the one or more fenestrations. The head (i) has an outer edge with a geometric shape configured to receive a driver, (ii) defines a threaded inner edge configured to receive a screw capture device, and (iii) is configured to receive a material from an external source and direct the material into the hollow portion of the cannulated body.

Implementations according to this disclosure includes a system for performing medical operations. The system includes an orthopedic screw and a driver. The orthopedic screw has a cannulated body and a head, where the head is configured to receive one end of the driver, and where the cannulated body defines (i) one or more fenestrations and (ii) a first hollow portion in fluid communication with the one or more fenestrations. The driver has a grip and a body that defines a second hollow portion within the body, where the second hollow portion is configured to accommodate (i) a screw capture device and (ii) a plunger configured to deposit a material into the cannulated body of the orthopedic screw.

Implementations according to this disclosure includes a method for performing medical operations. The method includes: securing a driver to a head of an orthopedic screw; while the driver is secured to the head of the orthopedic screw, inserting a screw capture device through a hollow portion of the driver and securing the screw capture device to the head of the orthopedic screw; and implanting, using the driver and the screw capture device, the orthopedic screw into one or more bones of a subject. This can be adjusted to be utilized with any form of surgical navigation (including robotic, fluoroscopic, or skin-based navigation). Moreover, the method includes, while the orthopedic screw is implanted in the one or more bones of the subject: detaching the screw capture device from the orthopedic screw and removing the screw capture device from the hollow portion of the driver; depositing, using a plunger, a material into the hollow portion of the driver; and directing, using the plunger and the driver, the material into a cannulated body of the orthopedic screw and through one or more one or more fenestrations of the orthopedic screw in fluid communication with the cannulated body.

The methods and implementations described are well-suited to the treatment of multiple spine pathologies. Some implementations can include fastening of pars interarticularis fractures to stimulate healing and fastening of vertebral articular processes to stimulate arthrodesis of facet joints. However, implementations are not limited to these indications and can be applied to other indications and other applications in the field of medical surgery.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7-8B illustrates an example of an orthopedic screw implanted for pars interarticular repair.

Like reference numbers and designations in the various drawings indicate like elements.

DETAILED DESCRIPTION

Figure 1:
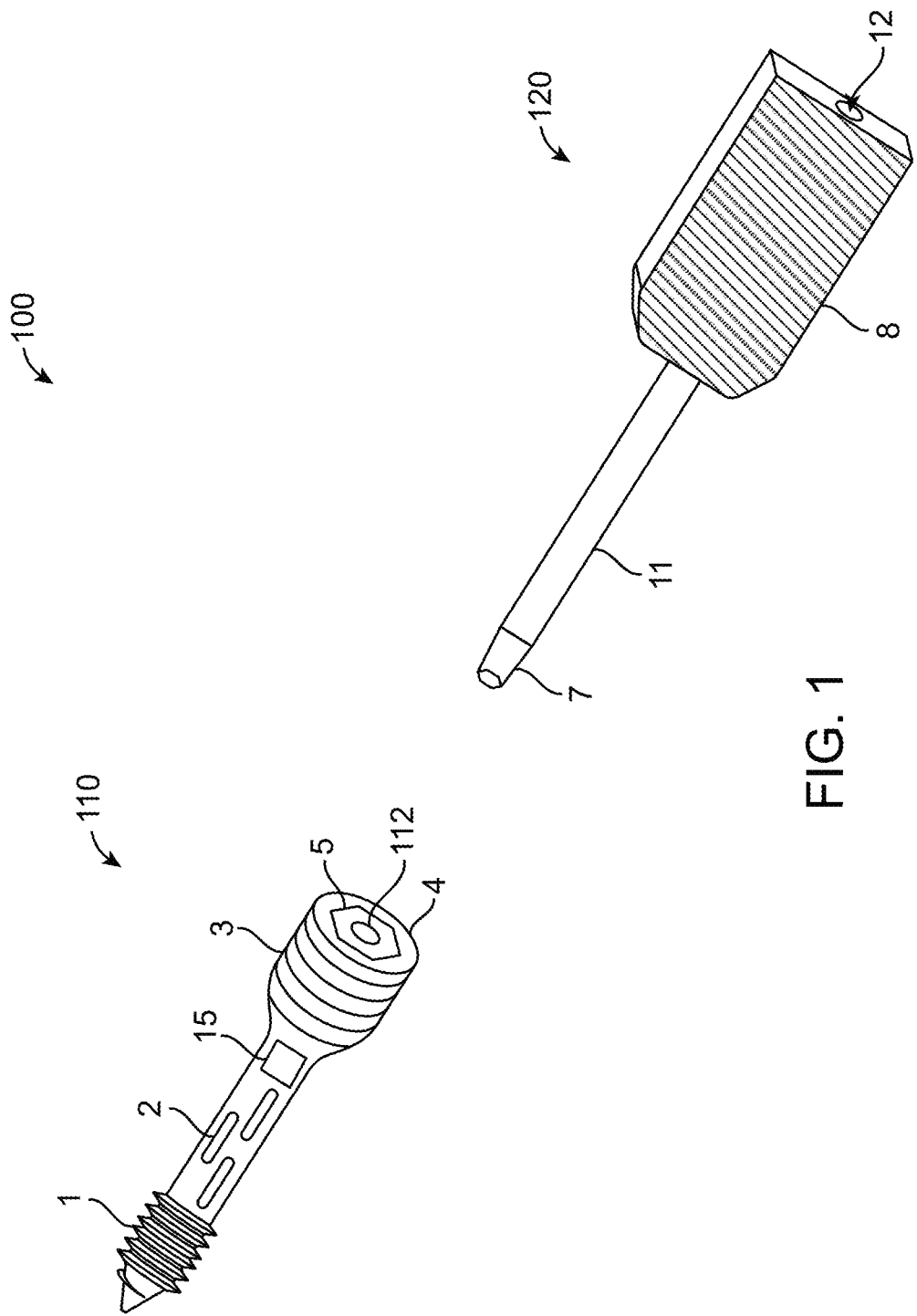
FIG. 1 is a diagram of an example of a system including an orthopedic screw and a driver for performing medical operations.

As described above, screws and screw fastening devices (also referred to as drivers) may be used across a wide range of medical procedures to secure, stabilize, or fasten components within the body. These tools often enable surgeons or medical professionals to fixate bones, secure implants, and/or stabilize structures during healing. The screws may be made of biocompatible materials and may be designed to integrate safely within the body parts.

Further, in many medical procedures, materials like bone grafts, demineralized bone matrix, or orthobiologics (referred to as "bone grafts") are inserted at specific target sites to promote healing, restore function, or provide structural support. However, these operations often require surgeons or medical professionals to work in confined spaces. This spatial constraint presents a challenge, particularly in surgeries where precise positioning is critical. Additionally, the accurate placement of screws or implants at certain points often require a high degree of precision to ensure surgical success and avoid complications.

Such issue becomes more pronounced when there is a need for precision in addition to spatial confinement. In such cases, surgeons are not only limited by the physical space in which they can operate but must also ensure accurate placement and fixation of screws, implants, or other materials. Misalignment or imprecision can lead to poor outcomes, complicating the patient's recovery.

Orthopedic procedures, particularly spinal surgeries, are some examples that require the spatial confinement and precision. Surgical treatment of spinal pathologies can involve decompression surgery, which can alleviate pressure on the spinal cord or nerves, or fusion surgery, which can remove painful motion from the spine.

A common source of low-back pain in adolescence and young adulthood is chronic fractures of the pars interarticularis (referred to as "pars"). These pars fractures often go on to non-union and can cause slippage of one vertebral body along another (referred to as spondylolisthesis). In many examples, if these fractures are untreated, patients may require a fusion surgery of a spinal segment (e.g., vertebrae above, intervertebral disc, vertebrae below) in adulthood.

To prevent the development of spondylolisthesis and allow rapid return to activity, in some examples surgeons will attempt to repair pars fractures.

Repairing pars fractures poses a specific challenge given the spatial confinement and precise trajectories required. In many cases, if placed imprecisely patients can have persistent nonunion and require eventual fusion. This is because many methods of repair do not allow compression across the fracture site or deposition of bone graft.

In patients who require fusion surgery for any reason, a common cause of failure after fusion surgery of a spinal segment is pseudoarthrosis, which is the failure of bone to gross across the two spinal segments and the persistence of motion between the segments. In some examples, one cause of the pseudoarthrosis is persistent micromotion across the fusion construct. In some examples, persistent motion can be due to factors like improper screw placement, inadequate fixation, or difficulty in precisely targeting the fusion site due to spatial constraints during surgery.

Moreover, to prevent pseudoarthrosis, one must understand areas where persistent motion occurs across a spinal segment and eliminate such motion in these areas by securely placing screws, rods, and bone grafts with high precision. Such motion in the spine may occur in two primary locations: anteriorly at the collagenous intervertebral disc and posteriorly at the bilateral facet joints. In some examples, when attempting to fuse the spine, surgeons can attempt to eliminate such motion by placing pedicle screws and rods which hold the vertebrae in place while bone attempts to grow across the levels, creating a "fusion mass." The successful fusion can be created in a number of places including across the disc space, across the transverse processes, or across the facet joints themselves. In some examples, the cartilage can be removed from the facet joint and the bone graft material can be inserted to achieve fusion. Again, successful spinal fusion requires eliminating motion in these areas by securely placing screws, rods, and/or bone grafts with high precision in the confined anatomy of the spinal column.

Implementations according to this disclosure describe systems and methods for percutaneous fusion of two bone segments, which address the issues described above. For instance, the system includes a partially threaded, cannulated, and fenestrated compression screw that has internal threads which allow for the fixation of a cannulated driver. The head of the screw defines (i) an outer edge configured to receive a driver and (ii) an inner edge with a threaded shape configured to receive a screw capture device. This screw head design enables the dual fixation of the screw when both the driver and the screw capture device are used at the same time. For instance, the cannulated driver can (i) secure the outer edge of the screw and (ii) further accommodate a screw capture device within the cannulated portion of the driver to thereby secure the inner edge of the screw head, thus enabling the dual fixation.

In some implementations, the system enables compression via a "lag by design" fashion and allows direct deposition of orthobiologic material (e.g., material that stimulate bone growth, BMP-2, etc.) into the screw and into the targeted area associated with the one or more bones of the subject (e.g., entity such as a human, an animal, etc.). For example, the orthobiologic material can include a material stimulating bone growth, which can include a bone graft, a demineralized bone matrix, a bone-morphogenic protein, or the like.

For instance, variable pitched threads can be defined at the screw head, which allows compression across the desired area of use. Moreover, for instance, the cannulated driver defines a space within the cannulated portion that is configured to (i) receive the orthobiologic material and (ii) accommodate a plunger. Accordingly, the cannulated driver can be used to deposit the orthobiologic material into the fenestrations of the cannulated body of the screw to thereby direct the orthobiologic material into a targeted region associated with the one of more bones of the subject. For example, the cannulated driver can directly deposit fusion substrate across the compressed segments.

In some implementations, the system can be used toward the treatment of pars fractures (e.g., pars interarticularis fractures) via screws with deposition of the orthobiologic material. In some implementations, the combined system can be used in other applications in the field of medical surgery.

In some implementations, a length of the screw and/or distributions of the fenestrations across the cannulated body of the screw can vary and can be configured depending on different types of surgical operations. For instance, regarding surgical operations associated with pars fractures, a length of the screw can be greater than or equal to 25 millimeters (mm) and less than or equal to 60 mm, with an aim to deposit bone graft across a middle one-third portion of the length of the screw (or a second portion of three equally distributed portions along the total length), thereby rendering the fenestrations to be defined or distributed across the middle one-third portion. Moreover, for example, regarding surgical operations associated with facet joints, the screw can be greater than or equal to 10 mm and less than or equal to 30 mm, with an aim to deposit bone graft across the middle one-third portion of the length of the screw.

Referring to FIG. 1, a diagram of an example of a system 100 is shown. The system 100 includes an orthopedic screw 110 and a driver 120 for performing medical operations. In some implementations, the system 100 can be used in performing medical procedures related to orthopedics. In some implementations, the system 100 can be used toward a pars interarticularis region of the one or more bones of a subject (e.g., entity such as a human, an animal, etc.). In some implementations, the system 100 can be used toward a facet joint of two bones of the subject.

Figure 7:
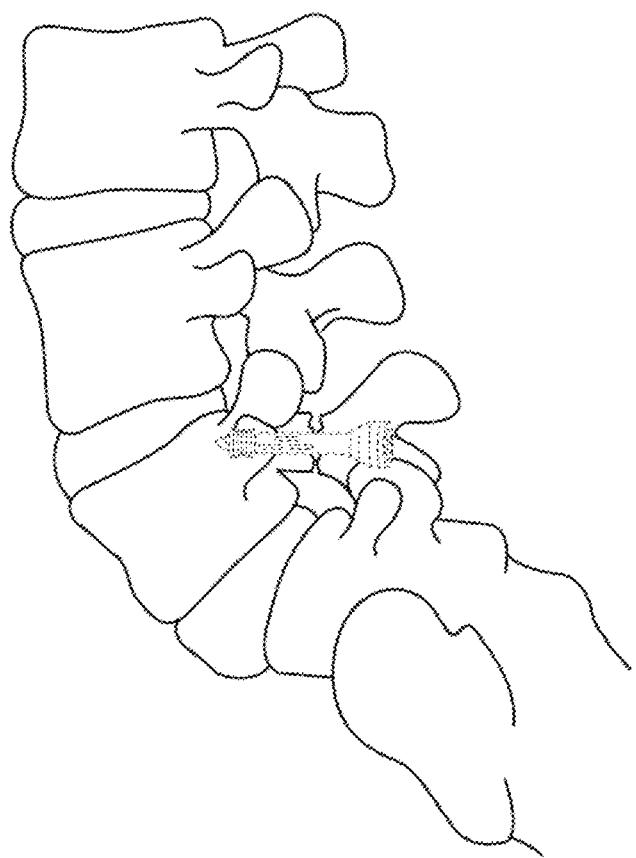
Figures 8A, 8B:
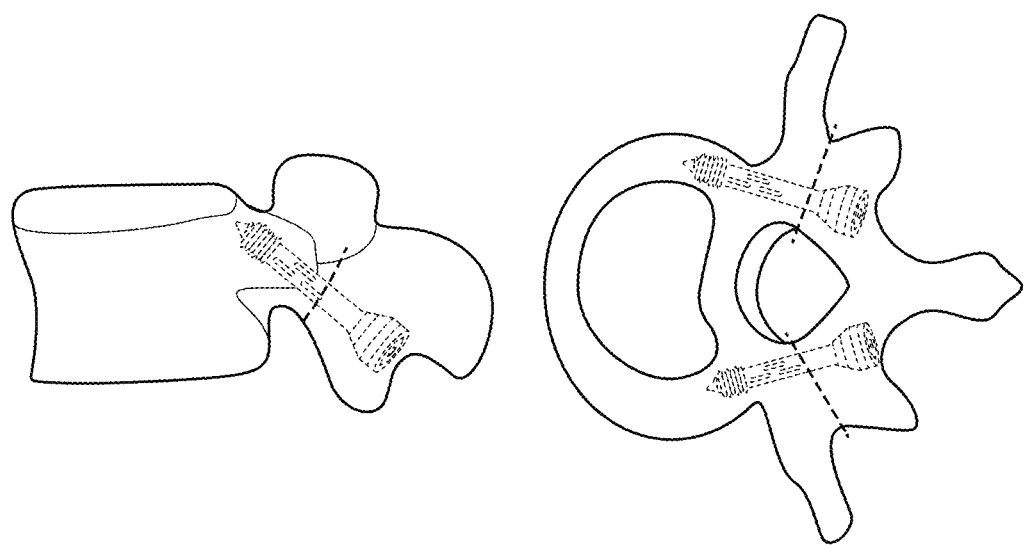
Figure 9A:
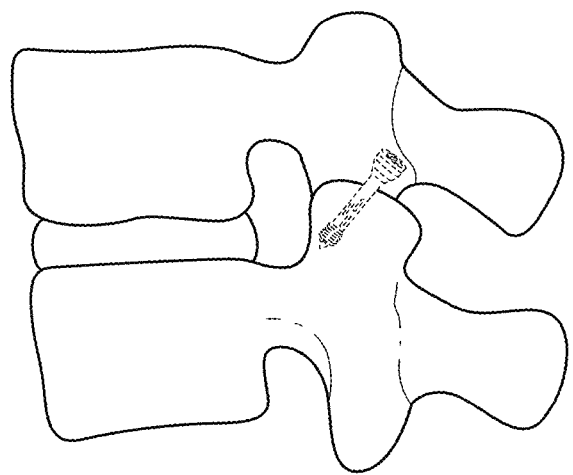
FIGS. 9A-10 illustrate examples of orthopedic screws implanted into the facet joint of a human.
Figure 9B:
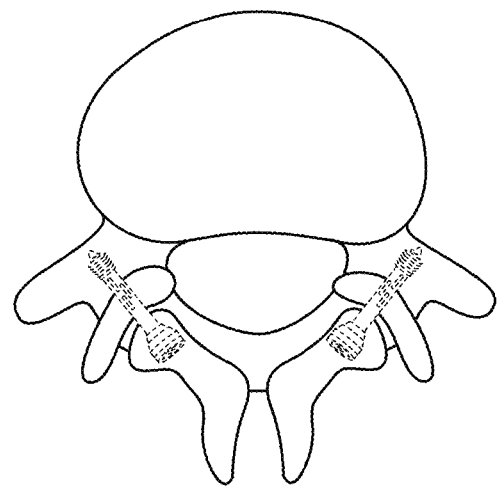
Figure 10:
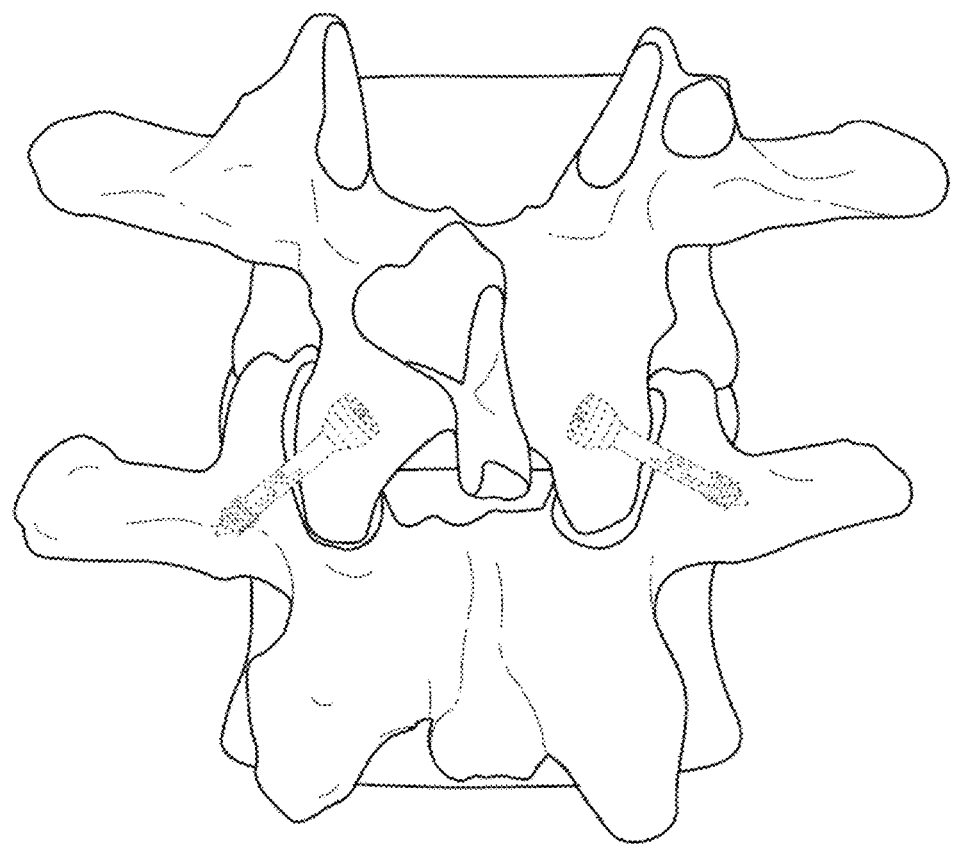

For instance, FIG. 7-8B illustrates an example of the orthopedic screw 100 implanted for pars interarticularis repair. Moreover, FIGS. 9B-10 illustrate examples of orthopedic screws 110 implanted into facet joints of a human. In particular, the system 100 can be used, in conjunction with the implementations described throughout this disclosure, to implant orthopedic screws 110 for facet fusion (as illustrated in FIG. 7) and pars interarticularis repair (as illustrated in FIG. 10) and to implant orthopedic screw 110 into a left facet joint and a right facet joint as illustrated in FIGS. 9A-10. For instance, FIGS. 9A-9B illustrate orthopedic screws 110 implanted into the left facet joint and the right facet joint of an example of a human lumbar vertebra, where FIG. 8A illustrates a side view of an example of a lumbar vertebra with a pars repair, FIG. 8B illustrates a perspective view of an example of a lumbar vertebra, FIG. 9A illustrates an angled view of an example of a region associated with a facet joint (including the facet joint, inferior articular process, and superior articular process), and FIG. 9B illustrates a perspective view of an example of a lumbar vertebra.

In some implementations, the system can be used in other applications in the field of medical surgery.

Figure 2:
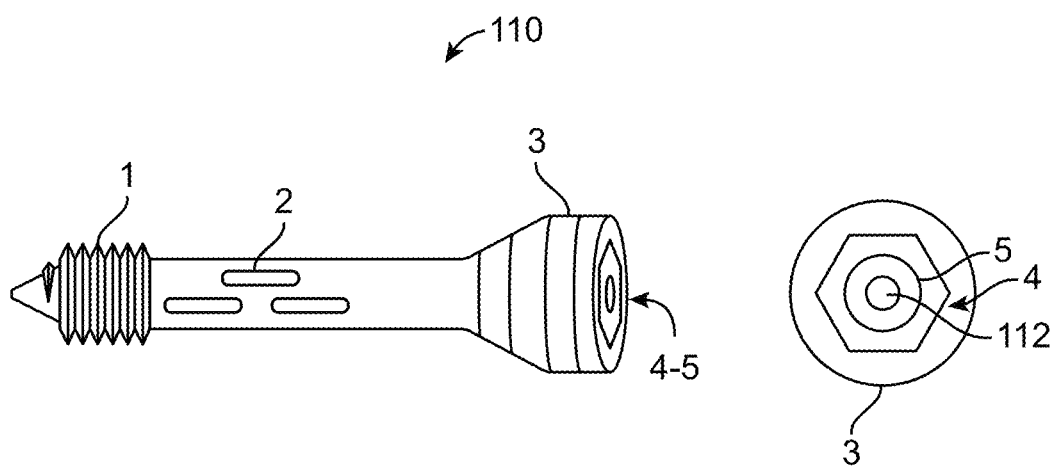
FIG. 2 is a diagram of an example of an orthopedic screw.

As illustrated in FIGS. 1 and 2, the orthopedic screw 110 includes a cannulated body and a head. The cannulated body can define (i) distal threads 1 and (ii) fenestrations 2 at various points across the body and (iii) a hollow portion 112 (e.g., cannula) within the body. Moreover, the cannulated body can include a solid, non-cannulated screw tip. In some implementations, the tip of the orthopedic screw 110 can be solid and a termination of the hollow portion 112 of the screw can vary based on size, where the hollow portion 112 can terminate in a flat surface or in a conical pattern that facilitates deposition of a substance from the hollow portion 112 and out the fenestrations.

The head of the orthopedic screw 110 can define (i) proximal threads 3, (ii) an outer edge 4, and (iii) an inner edge 5 having a threaded shape. In some implementations, the head defines variable-pitched threads to thereby enable compression across a targeted area associated with the one or more bones of the subject. In some implementations, the head defines external threads configured to allow full implantation of the screw into the one or more bones of the subject, where a thread pitch of the screw head threads varies from a pitch of distal threads to allow for compression across an area of interest.

The outer edge 4 of the head of the orthopedic screw 110 can have a geometric shape such as polygon, circle, etc. In some implementations, the geometric shape can correspond to a hexagonal shape. In some implementations, the geometric shape can correspond to another shape, such as a triangle, square, pentagon, or any other shape. Moreover, for instance, the outer edge 4 of the head can be configured to receive a driver 120 or a tip 7 of the driver 120, as will be further described below.

The inner edge 5 of the head can be configured to receive a screw capture device (e.g., screw capture device 130 of FIG. 4A), as will be further described below. In some implementations, while the tip 7 of the driver 120 is securing or holding the outer edge 4 of the head of the orthopedic screw 110, the screw capture device 130 that is disposed within the driver 120 (or a tip 6 of the screw capture device 130) can be inserted into the inner edge 5 to further secure the screw's head to the driver 120. Moreover, once the orthopedic screw 110 is fully secured (e.g., via double fixation through the tip 7 of the driver and the tip 6 of the screw capture device 130), the driver 120 and/or the screw capture device 130 can be used to implant the orthopedic screw 110 into one or more bones of the subject.

In some examples, the distal threads 1 of the cannulated body of the orthopedic screw 110 can have a pitch and/or diameter greater than those of the proximal threads 3 to allow for compression in a lay-by-technique fashion. In some implementations, the entire head of the orthopedic screw 110 can be threaded such that the orthopedic screw 110 can be buried in one or more bones of the subject.

In some examples, the hollow portion 112 of the cannulated body can extend to the inner edge 5 of the head and can be in fluid communication with the inner edge 5, where the inner edge 5 can receive a material (e.g., orthobiologic material) from an external source or the driver 120 and direct the material into the hollow portion 112 of the cannulated body. Moreover, for instance, such material can be directed into the hollow portion 112 of the cannulated body and directed out, via the fenestrations 2, to a targeted area or a tissue of the subject around the fenestrations 2. In some implementations, the material or the orthobiologic material can include a material stimulating bone growth, which can include a bone graft, a demineralized bone matrix, a bone-morphogenic protein, etc.

In some examples, the screw tip can be solid while the body is hollow. This can allow bone graft to be directed only out of the fenestrations and not through the screw tip.

In some implementations, the fenestrations 2 can be distributed across a middle portion of, and circumferentially through, the cannulated body.

In some implementations, a length of the orthopedic screw can be greater than or equal to 10 mm and less than or equal to 60 mm.

In some implementations, the orthopedic screw 110 is configured to be used in a pars interarticularis region of the one or more bones of the subject. In some implementations, the orthopedic screw 110 is configured to be used across a facet joint of two bones of the subject.

In some implementations, a length of the orthopedic screw 110 and/or distributions of the fenestrations 2 across the cannulated body of the orthopedic screw 110 can vary and can be configured depending on different types of surgical operations. For instance, regarding surgical operations associated with pars fractures, a length of the orthopedic screw 110 can be greater than or equal to 25 mm and less than or equal to 60 mm, with an aim to deposit bone graft across a middle one-third portion of the length of the orthopedic screw 110 (or a second portion of three equally distributed portions along the total length), thereby rendering the fenestrations 2 to be defined or distributed across the middle one-third portion. Moreover, for example, regarding surgical operations associated with facet joints, the orthopedic screw 110 can be greater than or equal to 10 mm and less than or equal to 30 mm, with an aim to deposit bone graft across the middle one-third portion of the length of the orthopedic screw 110.

Figure 3:
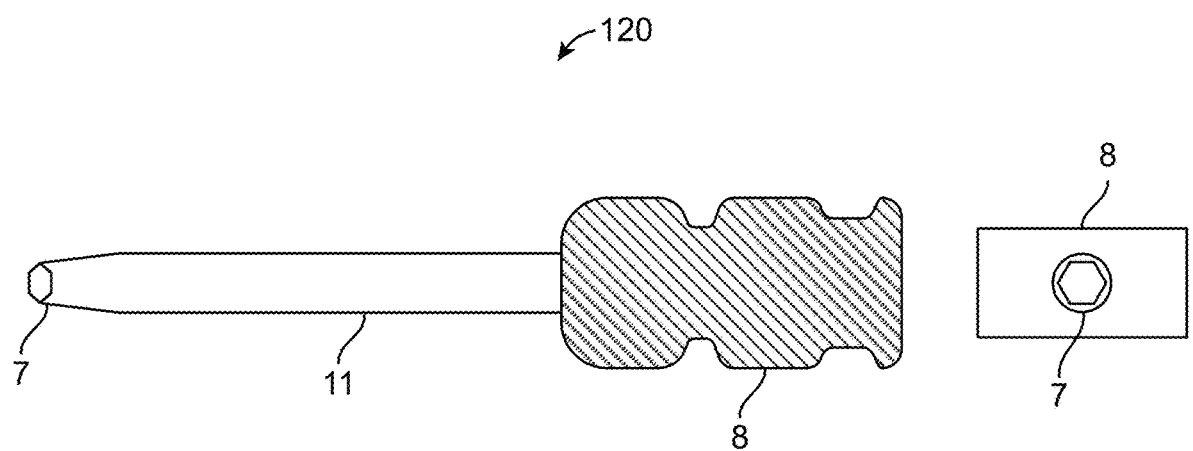
FIG. 3 is a diagram of an example of a driver.

Referring to FIGS. 1 and 3, the driver 120 includes a tip 7, a handle 8, and a driver body 11.

The tip 7 of the driver 120 can be configured to hold or secure the orthopedic screw 110 (e.g., via the outer edge 4). In some implementations, depending on the geometric shape of the outer edge 4 of the orthopedic screw 110, the tip 7 of the driver 120 can be configured or varied to hold or secure the outer edge 4. For instance, based on the geometric shape of the outer edge 4 being a hexagonal shape, the tip 7 of the driver 120 can be configured or varied to hold or secure the hexagonal outer edge 4.

The handle 8 of the driver can include or correspond to an ergonomic grip. In some implementations, the handle 8 can be a rigid handle or a torque driver handle.

The driver body 11 can define a driver hollow portion within the driver body 11. In some implementations, when the handle 8 wraps around the driver body 11 and the driver body 11 extends fully from one end of the handle to the tip 7, the driver hollow portion extends continuously through the driver body 11 from the end of the driver 120 to the tip 7 of the driver 120. In some implementations, when the driver body 11 does not fully extend through the handle, the driver hollow portion is defined jointly by the driver body and the handle. In such case, the driver hollow portion still extends continuously from the end of the driver 120 to the tip 7 of the driver 120.

Figure 4A:
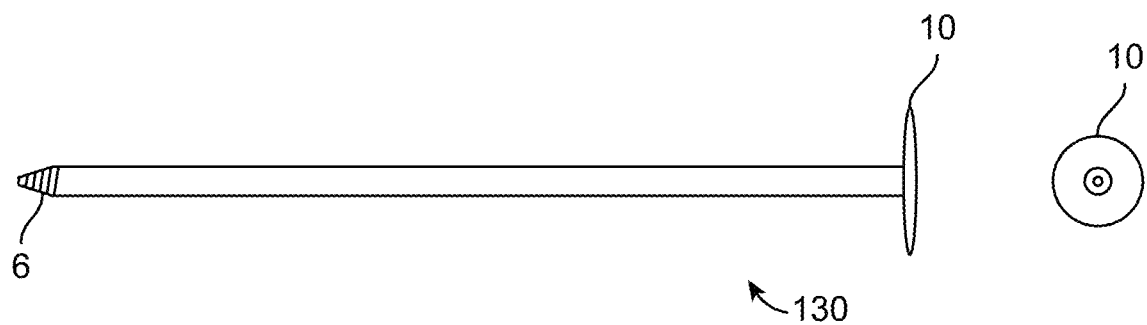
FIG. 4A is a diagram of an example a screw capture device.
Figure 4B:
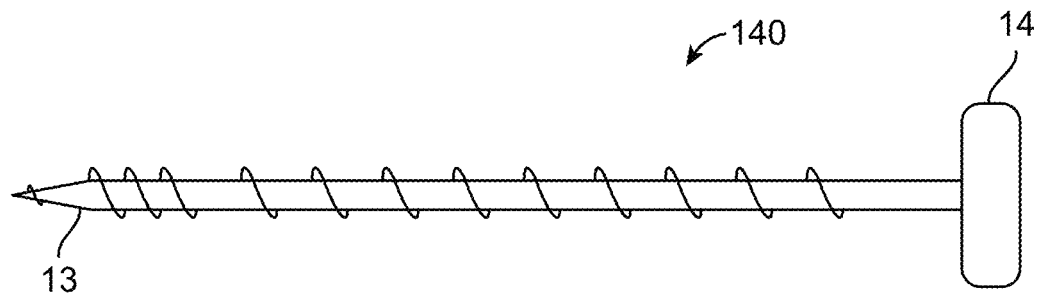
FIG. 4B is a diagram of an example of a plunger.

In some examples, the driver hollow portion is configured to accommodate (i) the screw capture device 130 of FIG. 4A and/or (ii) the plunger 140 of FIG. 4B.

In some examples, the driver hollow portion is configured to receive the orthobiologic material.

Figure 5:
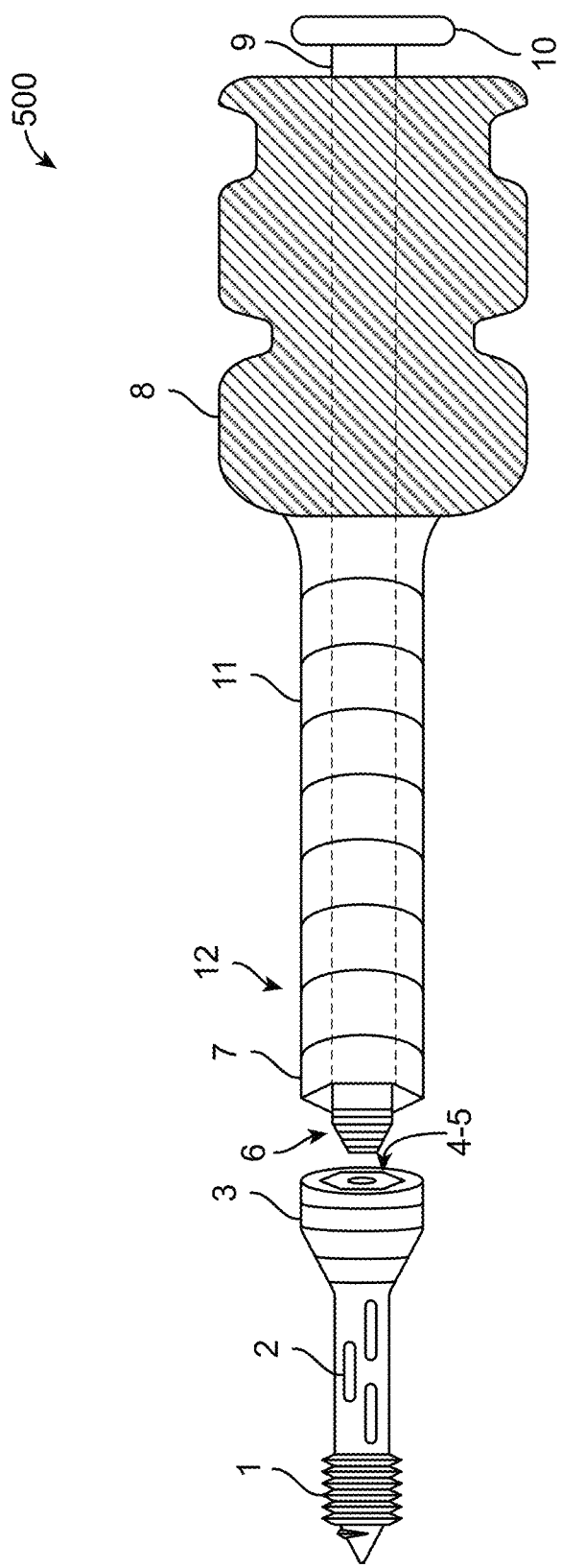
FIG. 5 is a side view of an example of a system including an orthopedic screw, a driver, and a screw capture device for performing medical operations.

In some examples, a surface of the driver hollow portion (or an inner surface of the body of the driver 120) can define internal threads 12 (as illustrated in FIG. 5). The internal threads 12 at the driver hollow portion can allow for an insertion of (i) the screw capture device 130 of FIG. 4A and/or (ii) the plunger 140 of FIG. 4B. Moreover, the internal threads 12 can allow for the insertion of the plunger 140 to deposit the orthobiologic material or the bone graft without escape around the sides.

In some implementations, the driver hollow portion is configured to accommodate only one of the screw capture device 130 or the plunger 140 at a time. In some implementations, the driver hollow portion is configured to fix the screw capture device 130 relative to the driver 120. In some implementations, the driver hollow portion is configured to fix the screw capture device 130 relative to the driver 120 and configured to fix the plunger 140 relative to the driver.

Referring to FIG. 4A, an example the screw capture device 130 is shown. The screw capture device 130 includes a body and a head. The body of the screw capture device 130 includes the tip 6 that can be inserted into the inner edge 5 of the head of the orthopedic screw 110 to thereby secure the orthopedic screw 110 to the driver 120 and/or to the screw capture device 130. Further, for instance, the screw capture device 130 can be used to tighten (or implant) the orthopedic screw 110 into the one or more bones of the subject. Moreover, the head of the screw capture device 130 includes or corresponds to an impaction plate 10 that provides barrier to over insertion through the driver 120.

Referring to FIG. 4B, an example of the plunger 140 is shown. The plunger 140 includes a body and a head. In some examples, the body of the plunger 140 includes a threaded plunger shaft 13 which engages with or intertwines with the internal threads 12 of the driver hollow portion to allow for deposition of the orthobiologic material or the bone graft without loss around sides. Moreover, in some examples, the head of the plunger 140 can include a handle 14 with ergonomic grip to thereby allow rapid spinning of the plunger 140 into or within the driver 120.

Referring back to FIGS. 1 and 3, in some implementations, an outer surface of the driver 120 can be configured to accommodate or receive a navigation array 15. For instance, the navigation array 15 can include or correspond to a tracking device that can help surgeons position implants and/or surgical tools. For instance, the navigation array 15 can include or correspond to a device that incorporates technologies such as optical tracking, electromagnetic tracking, mechanical tracking, or similar systems. In some implementations, the navigational array 15 can include one or more of fluoroscopic guidance device, reflective marker, camera, light-emitting diode, or receiver coil. For instance, the reflective marker can be used in conjunction with an infrared camera for optical tracking. For instance, the receiver coil can work in conjunction with a magnetic field generator and display device near surgical site. Moreover, for instance, the fluoroscopic guidance device can be used to provide imaging (e.g., real-time X-ray imaging, etc.) of the surgical site to help surgeons visualize the relevant position and movement of the surgical tools and/or implants. In some implementations, an outer surface of the driver 120 can be configured to accommodate or receive the navigational array 15.

In some implementations, the navigation array can correspond to, or can be used in conjunction with, one or more existing navigation systems.

Moreover, implementations associated with an operation or a method of using the system 100 (including the orthopedic screw 110 and the driver 120) along with the screw capture device 130 and the plunger 140 are discussed below with respect to FIG. 6.

In addition to a perspective view illustrated in FIG. 1, FIG. 5 illustrates a side view 500 of an example of the system 100.

Figure 6:
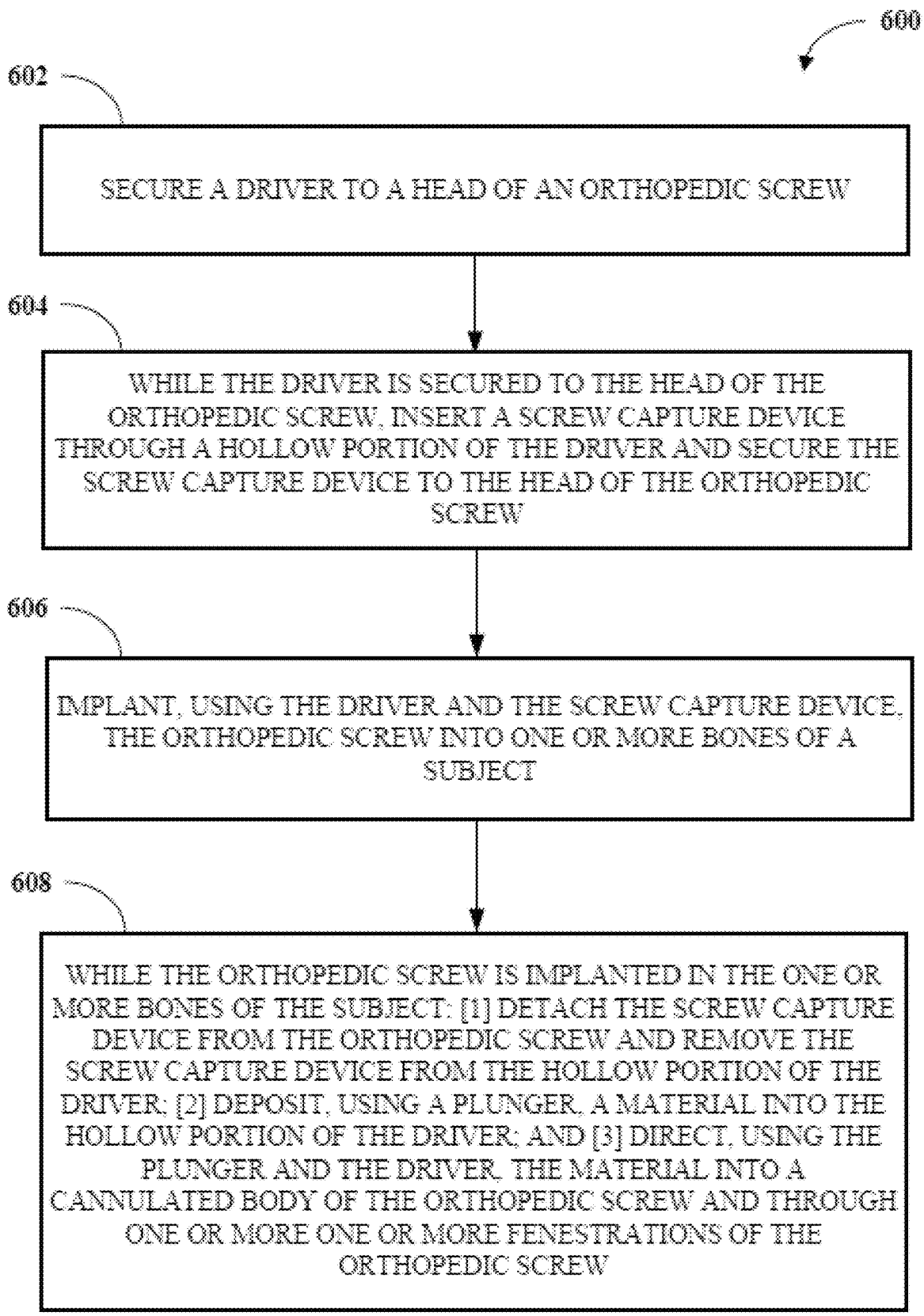
FIG. 6 is a flow chart diagram of an example process for using a system for performing medical operations.

FIG. 6 is a flow chart diagram of an example process 600 for using the system 100 for performing medical operations. For example, the example process 600 can implement, be implemented by, or be implemented in conjunction with, the orthopedic screw 110, the driver 120, the screw capture device 130, the plunger 140, and implementations described in FIGS. 1-5.

At 602, a driver (e.g., the driver 120) is secured to a head of an orthopedic screw (e.g., the orthopedic screw 110). In some implementations, securing the driver to the head of the orthopedic screw includes securing the driver to a geometric-shaped (e.g., polygonal-shaped, hex-shaped, circular-shaped) outer edge of the head of the orthopedic screw. In some implementations, the head of the orthopedic screw defines an inner edge at a radially inner portion of the head and securing the screw capture device to the head of the orthopedic screw includes securing the screw capture device to the inner edge of the head. In some examples, the screw can have a length that is greater than or equal to 10 mm and less than or equal to 30 mm.

At 604, while the driver is secured to the head of the orthopedic screw, a screw capture device (e.g., the screw capture device 130) is inserted through a hollow portion of the driver and the screw capture device is secured to the head of the orthopedic screw. For instance, via double fixation through a tip (e.g., the tip 7) of the driver and a tip (e.g., the tip 6) of the screw capture device, the orthopedic screw can be firmly secured to the driver and/or the screw capture device.

At 606, the orthopedic screw is implanted into one or more bones of the subject by using the driver and the screw capture device. In some implementations, the orthopedic screw can be fastened into the one or more bones of the subject by using the screw capture device while the driver is secured to the head of the orthopedic screw.

In some implementations, implanting the orthopedic screw into the one or more bones of the subject includes implanting the orthopedic screw into a pars interarticularis region of the subject. In such cases, a length of the orthopedic screw can be greater than or equal to 25 mm and less than or equal to 60 mm and the fenestrations at the orthopedic screw can be distributed across a middle one-third portion of three equally distributed portions along the length of the orthopedic screw.

In some implementations, implanting the orthopedic screw into the one or more bones of the subject includes implanting the orthopedic screw into a facet joint region of the subject. In such cases, a length of the orthopedic screw can be greater than or equal to 10 mm and less than or equal to 30 mm and the fenestrations at the orthopedic screw can be distributed across a middle one-third portion of three equally distributed portions along the length of the orthopedic screw.

In some implementations, prior to implanting the orthopedic screw into the one or more bones of the subject, the example process 600 can further include determining, based on a navigation array that is disposed at the driver, a targeted implant area of the orthopedic screw.

In some implementations, prior to implanting the orthopedic screw into the one or more bones of the subject, the example process 600 can further include determining, based on at least one of a fluoroscopic, computed tomography, skin-based, or robotic guidance device that is disposed at the driver, a targeted implant area of the orthopedic screw.

At 608, while the orthopedic screw is implanted in the one or more bones of the subject: [1] the screw capture device is detached from the orthopedic screw and is removed from the driver hollow portion; [2] a material (e.g., the orthobiologic material) is deposited into the driver hollow portion by using the plunger; and [3] the material is directed into a cannulated body of the orthopedic screw and through the one or more one or more fenestrations of the orthopedic screw (which are in communication with the cannulated body of the orthopedic screw) toward the targeted implant area associated with the one or more bones of the subject, by using the plunger and the driver. In some implementations, the driver hollow portion is configured to accommodate only one of the plunger or the screw capture device at a time. In some implementations, the material includes at least one of a bone graft material, a demineralized bone matrix material, or a bone-morphogenic protein.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system for performing medical operations, the system comprising:
   an orthopedic screw and a driver,
   the orthopedic screw having a cannulated body and a head,
      wherein the head is configured to receive one end of the driver, and
      wherein the cannulated body defines (i) one or more fenestrations and (ii) a first hollow portion in fluid communication with the one or more fenestrations; and
   the driver having a grip and a body that defines a second hollow portion within the body, and
      wherein the second hollow portion is configured to accommodate (i) a screw capture device and (ii) a plunger configured to deposit a material into the cannulated body of the orthopedic screw,
      wherein the second hollow portion is configured to accommodate only one of the plunger or the screw capture device at a time, and
      wherein the head of the orthopedic screw (i) has a geometrically-shaped outer edge configured to receive the one end of the driver, (ii) defines a inner edge with a threaded shape configured to receive the screw capture device, and (iii) is configured to receive the material and direct the material into the first hollow portion of the cannulated body of the orthopedic screw to thereby deposit the material into a tissue associated with the one of more bones of a subject.

2. The system of claim 1, wherein the first hollow portion of the cannulated body of the orthopedic screw extends to the inner edge of the head of the orthopedic screw and is in fluid communication with the inner edge, and wherein the inner edge is configured to receive the material and direct the material into the first hollow portion of the cannulated body of the orthopedic screw and out the fenestrations.

3. The system of claim 1, wherein the material comprises a material that stimulates bone growth.

4. The system of claim 1, wherein the one or more fenestrations are provided in a plurality, wherein the fenestrations are distributed across a middle portion of, and circumferentially through, the cannulated body.

5. The system of claim 1, wherein the second hollow portion of the driver is configured to fix the screw capture device relative to the driver.

6. The system of claim 1, wherein the second hollow portion of the driver is configured to fix the screw capture device relative to the driver and configured to fix the plunger relative to the driver.

7. The system of claim 1, further comprising a navigation array that is disposed at an outer surface at the driver.

8. The system of claim 1, wherein the orthopedic screw is configured to be used in a pars interarticularis region of one or more bones of a subject, wherein a length of the orthopedic screw is greater than or equal to 25 mm and less than or equal to 60 mm, and wherein the fenestrations are distributed across a middle one-third portion of three equally distributed portions along the length of the orthopedic screw.

9. The system of claim 1, wherein the orthopedic screw is configured to be used across a facet joint of two bones of a subject, wherein a length of the orthopedic screw is greater than or equal to 10 mm and less than or equal to 30 mm, and wherein the fenestrations are distributed across a middle one-third portion of three equally distributed portions along the length of the orthopedic screw.

10. The system of claim 1, wherein a length of the orthopedic screw is greater than or equal to 25 mm and less than or equal to 60 mm.

11. The system of claim 1, wherein the first hollow portion of the cannulated body extends to the inner edge of the head and is in fluid communication with the inner edge, and wherein the inner edge is configured to receive the material and direct the material into the first hollow portion and the one or more fenestrations of the cannulated body to thereby direct the material into the tissue associated with the one of more bones of the subject.

12. The system of claim 1, wherein the cannulated body comprises a solid, non-cannulated screw tip.

13. The system of claim 12, wherein the tip of the screw is solid, and wherein the hollow portion terminates in a flat surface or in a conical pattern that facilitates deposition of a substance from the hollow portion and out the fenestrations.

14. The system of claim 1, wherein the head defines variable-pitched threads configured to provide compression across a targeted area associated with the one or more bones of the subject.

15. The system of claim 1, wherein the head defines external threads configured to allow full implantation of the screw into the one or more bones of the subject, and wherein a thread pitch of the external threads varies from a pitch of distal threads to allow for compression across an area of interest.

16. The system of claim 1, wherein the material comprises at least one of material that stimulates bone growth, a bone graft material, a demineralized bone matrix material, or a bone-morphogenic protein.

17. The system of claim 1, wherein the one or more fenestrations are provided in a plurality, wherein the fenestrations are distributed across a middle portion of, and circumferentially through, the cannulated body.

* * * * *